United States Patent [19]
Lee et al.

[11] Patent Number: 5,894,025
[45] Date of Patent: Apr. 13, 1999

[54] VALVE PIN ACTUATOR

[75] Inventors: Christopher W. Lee, Burlington; Mark D. Moss, Boxford, both of Mass.

[73] Assignee: KONA Corporation, Gloucester, Mass.

[21] Appl. No.: 08/874,962

[22] Filed: Jun. 13, 1997

[51] Int. Cl.$^6$ .................................................. B29C 45/23
[52] U.S. Cl. .................................... 425/562; 425/564
[58] Field of Search ................................ 425/549, 562, 425/563, 564, 565, 566

[56] References Cited

U.S. PATENT DOCUMENTS 4,698,013  10/1987  Butcher ................................... 425/549

OTHER PUBLICATIONS

"KONA HYD-4 Valve Gate Actuator", DWG No. 47-18-101, Rev. 3.
"T-10VG Installation and Seal Ring Details", DWG No. T10VG-001, Rev. 4.

*Primary Examiner*—Tim Heitbrink
*Attorney, Agent, or Firm*—Wolf, Greenfield & Sacks, P.C.

[57] ABSTRACT

A valve pin actuator is disclosed that includes a cylinder mounted to the clamping plate, a piston slidably mounted in the cylinder, and a valve pin assembly carried by the piston. A hydraulic or pneumatic circuit is provided for controlling the movement of the piston, and in turn translation of the valve pin between the seated and unseated positions. The valve pin assembly includes a first part removably secured to the piston so as to translate therewith, and a second part for receiving the valve pin and secured to said manifold. The actuator assembly enables removal of the clamping plate without removal of the valve pin assembly, and also adjusting of the valve pin without removal of the clamping plate. The assembly further provides a clearance between the piston and valve pin assembly, to accommodate expansion and movement of the manifold that would otherwise cause a side load to be exerted on the valve pin.

20 Claims, 7 Drawing Sheets

VALVE PIN ACTUATOR

BACKGROUND OF THE INVENTION

1. Field of the Invention

This invention relates in general to improvements in valve gate actuators used in injection molding systems. Although not limited to any particular field of use, the actuator of the present invention is in particular useful for the fabrication of large molded parts such as, for example, automotive bumper fascia.

2. Description of the Related Art

In hot runner systems used in injection molding, valve pins are used to open and close the gate to a cavity in the mold in which the molded part is formed. Typically, the valve pin is opened prior to the start of injection allowing plastic to flow into the cavity of the mold. The valve pin is maintained in the open position while the melt material is being packed in the cavity to form the molded part. At the end of packing, the pin is closed to eliminate any drooling from the hot runner nozzle and eliminate any vestige that would be left on the molded part by forming a smooth surface with inner surface of the mold cavity.

The valve pin is typically located in the center of the bore of the hot runner nozzle. In a multiple gate system that uses a plurality of nozzles, the nozzles typically will be connected to a heated manifold, which in turn receives the machine nozzle from the injection molding machine. The tip of the valve pin extends to the gate of the mold. From its tip, the valve pin extends through the hot runner nozzle, through a bore in the manifold, and is connected at one end to an actuator located above the manifold and attached to a top clamp plate. A valve pin cylinder in the actuator is usually actuated using either hydraulic or pneumatic pressure.

In hot runner systems, that there are two basic techniques for providing valve pin actuators. The first technique is to build the hydraulic actuator assembly into the top clamp plate. With this product, when performing maintenance on, or disassembling, the system, it is necessary to allow the manifold to cool, then remove the valve pin from the hot runner manifold prior to removal of the top clamp plate. This can require a significant amount of time. Since the valve pin is precision machined to fit at the gate, great care must be taken when replacing the valve pin. Molds for large automotive parts are very large, thus, ease of assembly and disassembly for maintenance of the hot runner is an important issue.

A further drawback of prior systems is the fact that the valve pin itself is typically mounted in the actuator in a relatively fixed position and is free to move only in one direction. The manifold will expand relative to the top clamp plate when heated. Thus, the valve pin actuator has to be positioned so that the pin can slip relative to the actuator in the expansion direction. If the alignment or predicted expansion direction is off, the pin sees a side load resulting from the expansion of the manifold, possibly resulting in binding of the pin in the valve pin bushing, or even pin breakage. Thus, prediction of the line of expansion is necessary along with precise alignment of the valve pin.

Another type of actuator has the entire hydraulic actuator assembly bolted to the hot runner manifold. This system includes through holes in the top clamp plate to provide clearance for the actuator assembly. There are several drawbacks associated with this system. For example, because the actuator cylinder is directly bolted to the heated manifold, the actuator cylinder needs water channels formed therein for cooling. Further, because it is bolted directly to the manifold, flexible water and hydraulic lines must be run to each valve gate actuator between the manifold and the top clamp plate. It can be cumbersome to position these lines, and they can get hot due to proximity to the manifold causing deterioration of hoses and fittings. Leakage can result. If hydraulic fluid contacts the hot manifold, hazards may result.

Accordingly, it is an object of the present invention to provide an improved valve pin actuator, particularly wherein the actuator itself can be at least partially disassembled without requiring removal of the valve pin.

Another object of the present invention is to provide a valve pin actuator in which the cylinder and piston along with the hydraulic fluid lines are retained within the top clamp plate, while the valve pin assembly itself stays with the hot runner system.

Still another object of the present invention is to provide an improved valve pin actuator wherein the actuator can be at least partially dissembled without the need to drain the hydraulic fluid lines, and without the need to remove the valve pin from the hot runner manifold.

A further object of the present invention is to provide an improved valve pin actuator that provides for a clearance between the actuator piston and actuator cap. This clearance allows for relative expansion between the hot runner manifold and the top clamp plate in any direction, without putting a significant side load force on the valve pin.

Still another object of the present invention is to provide an improved valve pin actuator that provides for a more simplified operating hydraulic circuit.

SUMMARY OF THE INVENTION

In one illustrative embodiment of the invention, an injection molding system is provided that includes a valve pin actuator adapted for mounting between a plastic distribution manifold and an overlying clamping plate. The valve pin is adapted to extend through an injection nozzle and positioned to seat and unseat at a mold gate.

The valve pin actuator includes a cylinder mounted to the clamping plate; a piston slidably mounted in the cylinder; a valve pin assembly carried by the piston and for holding a top end of the valve pin; and a circuit coupled to said piston to control sliding movement thereof and in turn translation of said valve pin between the seated and unseated positions.

The valve pin assembly includes a first part removably secured to the piston so as to translate therewith, and a second part for receiving said valve pin and secured to said manifold.

BRIEF DESCRIPTION OF THE DRAWINGS

Numerous other objects, features and advantages of the present invention will be apparent based upon the following description of drawings.

DETAILED DESCRIPTION

Figure 1:
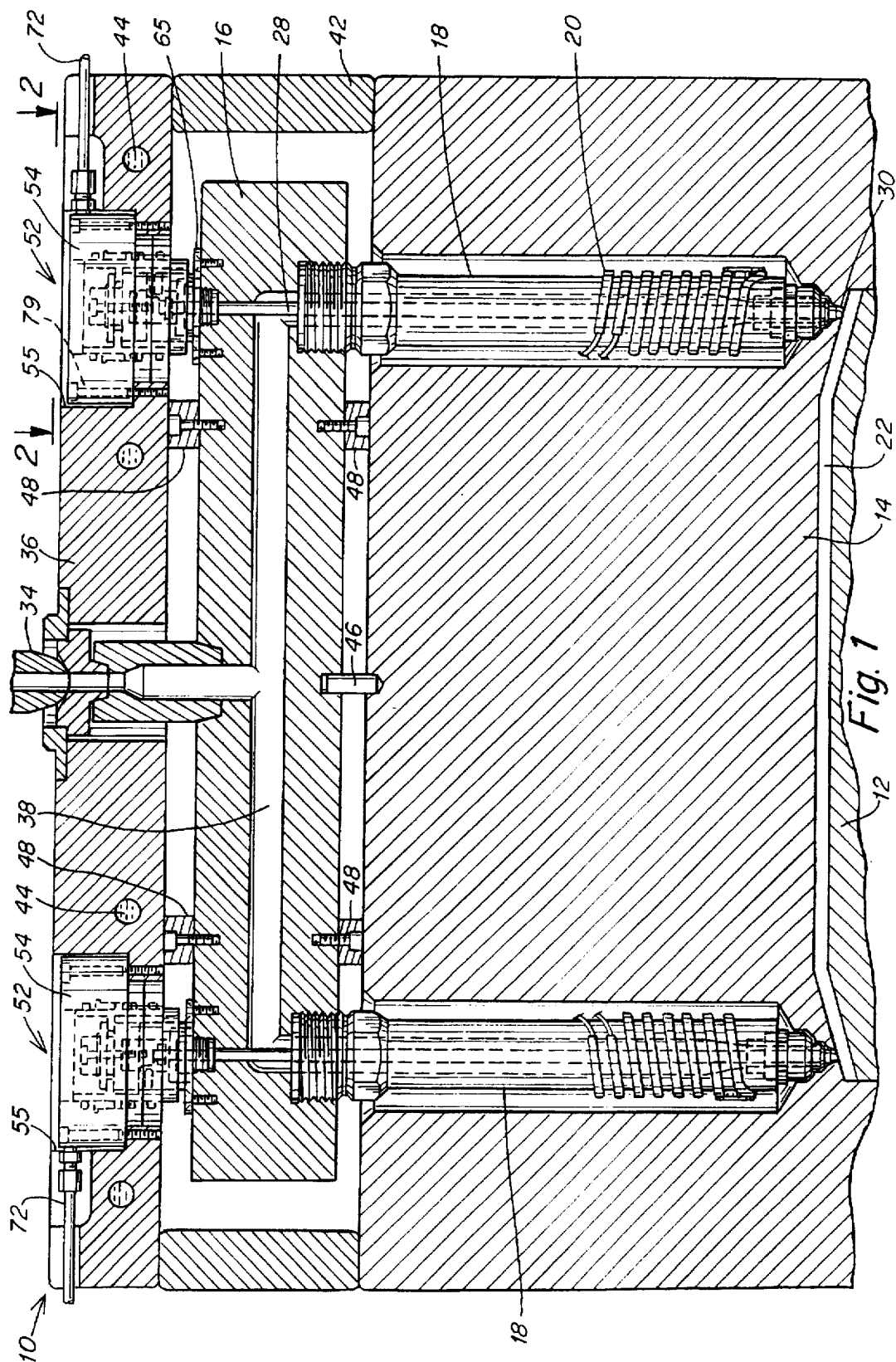
FIG. 1 is a cross-sectional side view of a preferred embodiment of the valve pin actuator as employed in an injection molding system.
Figure 2:
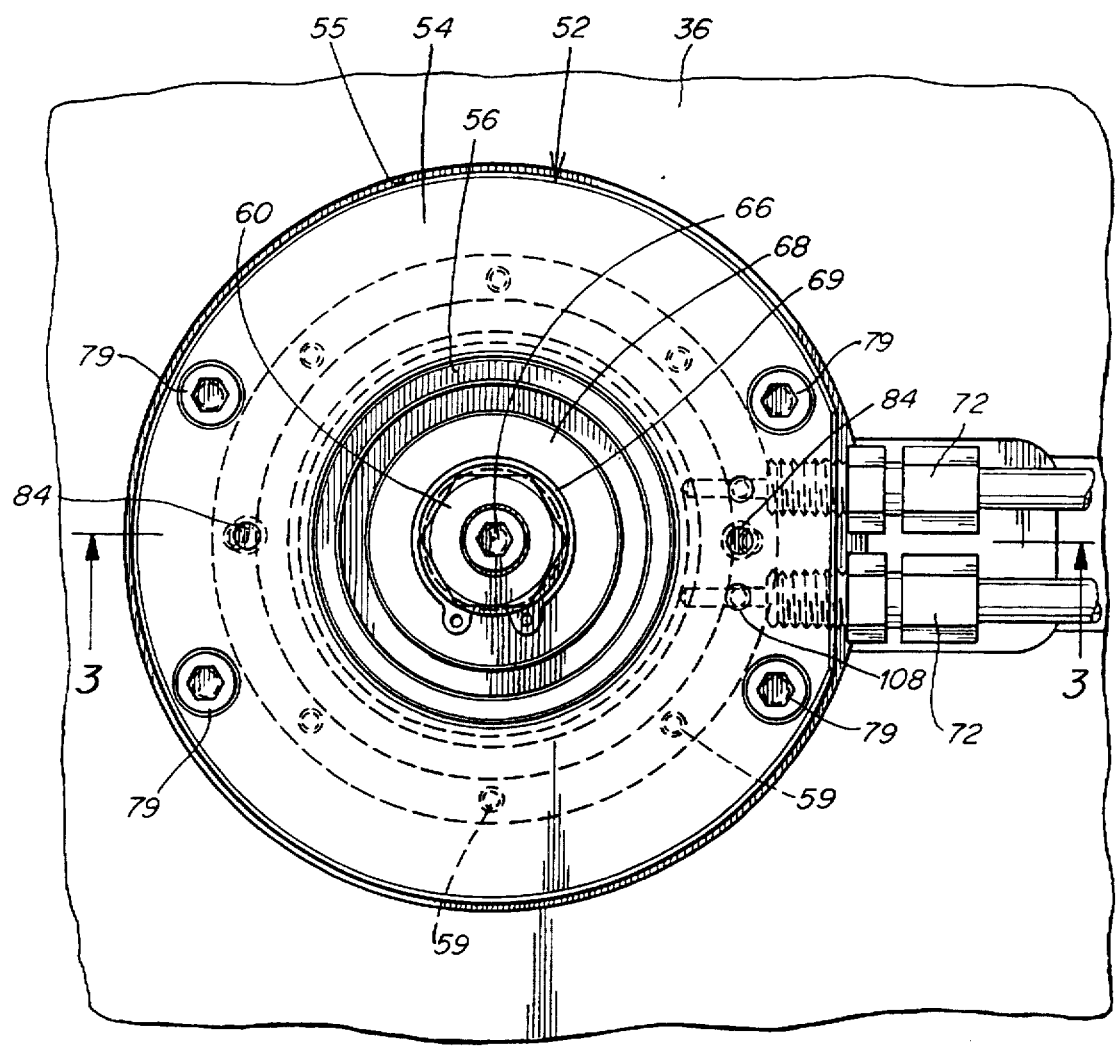
FIG. 2 is a top plan view of the valve pin actuator as taken along line 2—2 of FIG. 1.
Figure 3:
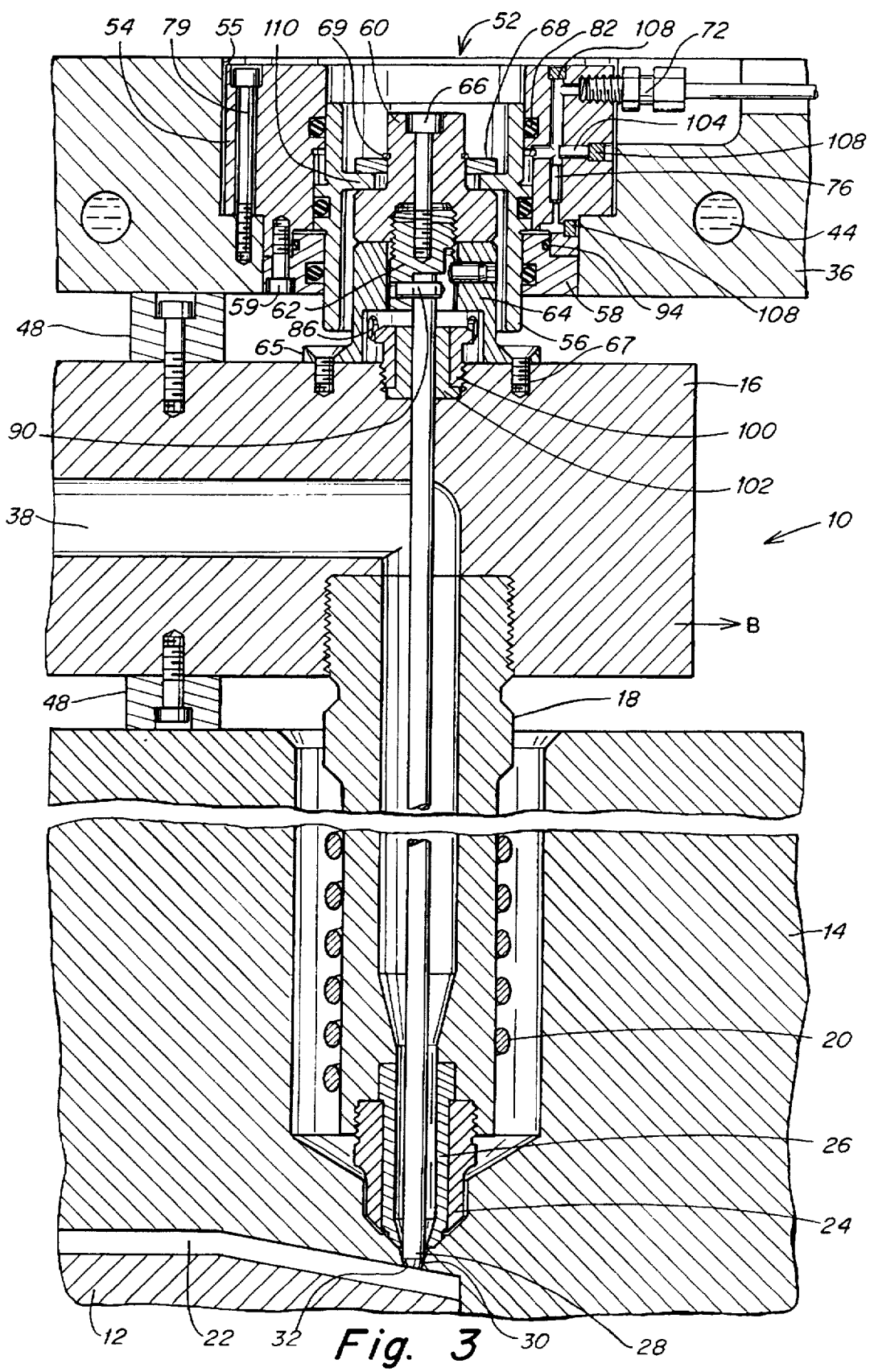
FIG. 3 is an enlarged fragmentary cross-sectional side view of the assembly of FIGS. 1 and 2 as taken along line 3—3 of FIG. 2.

Reference is now made to a preferred embodiment of the present invention as illustrated in FIGS. 1–9 herein. In particular, FIGS. 1–3 illustrate an injection molding system 10 used to mold a plastic part. As illustrated, there is a mold part 12, typically called a core block, and a mold part 14, typically called a cavity block. Disposed over the upper mold part 14 is the hot runner manifold 16. As illustrated in, for example, FIGS. 1 and 3, the hot runner manifold 16 supports nozzles 18, which are threadably screwed therein. About each nozzle 18 there is provided a heater 20, for maintaining the melt material passing through the nozzle at its process temperature. Also, heat pipes may be employed in the nozzle 18, alone, or in conjunction with the band heaters 20, such as illustrated in U.S. Pat. No. 4,389,002.

As illustrated in FIGS. 1 and 3, between mold parts 12 and 14, there is a cavity 22 that determines the contour of the molded part being produced. Also, as noted in particular in FIG. 3, at the end of the nozzle 18, there is provided a nozzle tip 24, disposed about a nozzle insert 26.

FIG. 3 also illustrates the valve pin 28 in its closed position. The valve pin 28 extends through a central bore in the nozzle 18, and, in the embodiment illustrated, has a tapered end 30 that mates with a like tapered gate 32 in the mold. It should be noted that the invention is not limited to a particular type of nozzle arrangement, as different tip and insert configurations are possible. For example, the gate could be formed in the tip, with the valve pin mating with the tapered surface of the tip. Furthermore, as shown in FIGS. 1 and 3, when gating directly onto an angled part surface, the valve pin can be contoured to match the part.

FIG. 1 also illustrates the machine nozzle 34 of the injection molding machine that feeds the molten plastic material through a porting arrangement that extends through the top clamping plate 36. This porting arrangement also feeds through a bore 38 in the hot runner manifold 16. The bore 38 feeds each of the nozzles 18.

FIG. 1 also illustrates spacers 42 for properly positioning the clamping plate 36 relative to the mold part 14. The clamping plate 36 is cooled as illustrated by the water channels 44. To position the manifold 16 there is provided a locating pin 46 disposed between the manifold and the mold part. FIG. 1 also illustrates a series of support pads 48 for providing proper distancing and positioning between the mold part 14, the manifold 16, and the cooled clamping plate 36.

In the drawings, there is illustrated, associated with the valve pin 28, the actuator assembly 52. For the basic components of the actuator assembly 52, reference may be made to the exploded perspective view of FIG. 9, and FIG. 8, which show the various components. The actuator assembly 52 includes a cylinder 54 which is mounted in an accommodating aperture 55 in the clamping plate 36. As illustrated, for example, in FIG. 3, this aperture is of a stepped configuration. The actuator assembly also includes a piston 56 supported within the cylinder 54 and held in place by a retainer 58.

Figure 8:
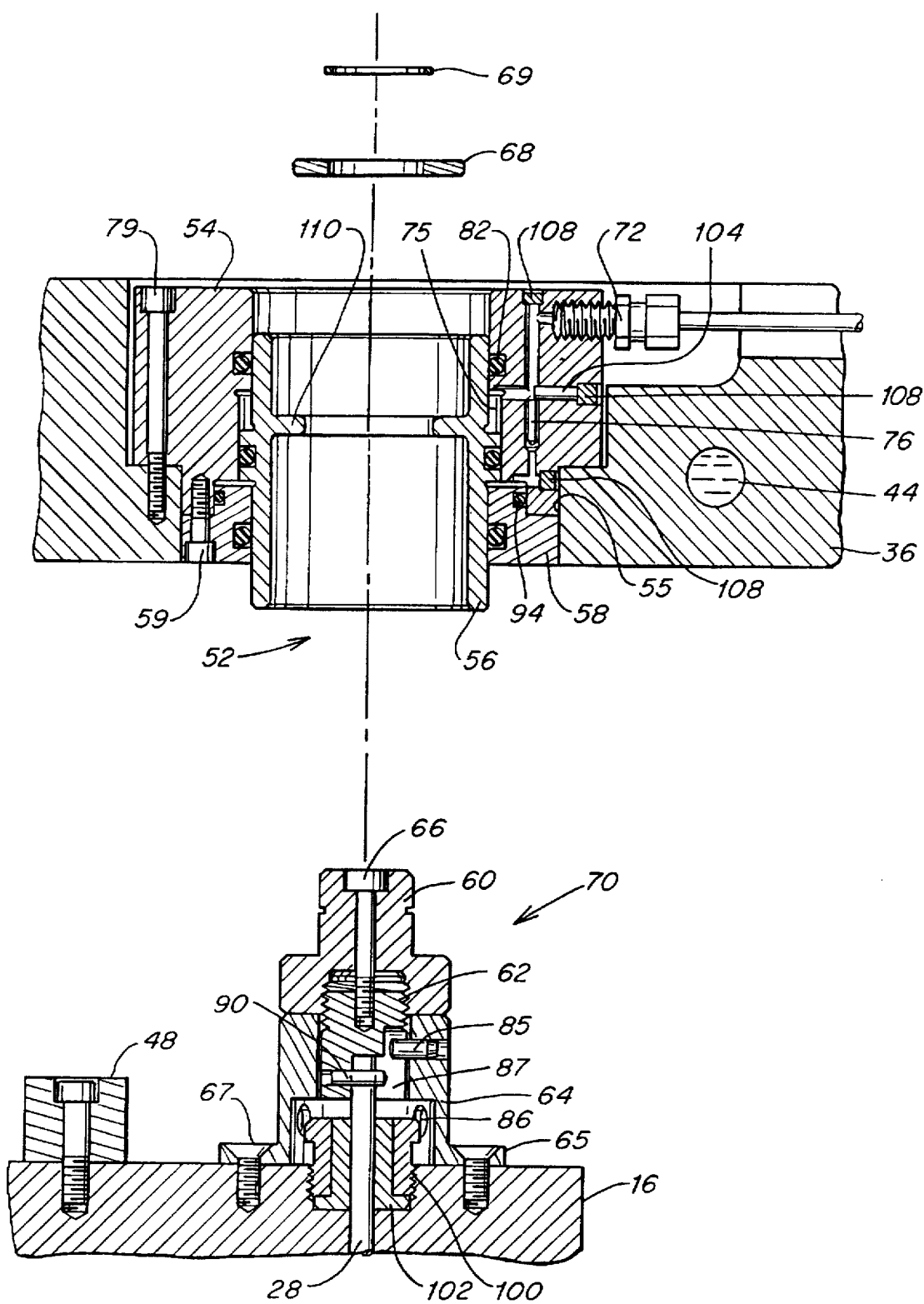
FIG. 8 is a somewhat schematic exploded cross-sectional side view showing removal of the clamping plate and actuator body without requiring the disconnection of any hydraulic hoses or the valve pin.
Figure 9:
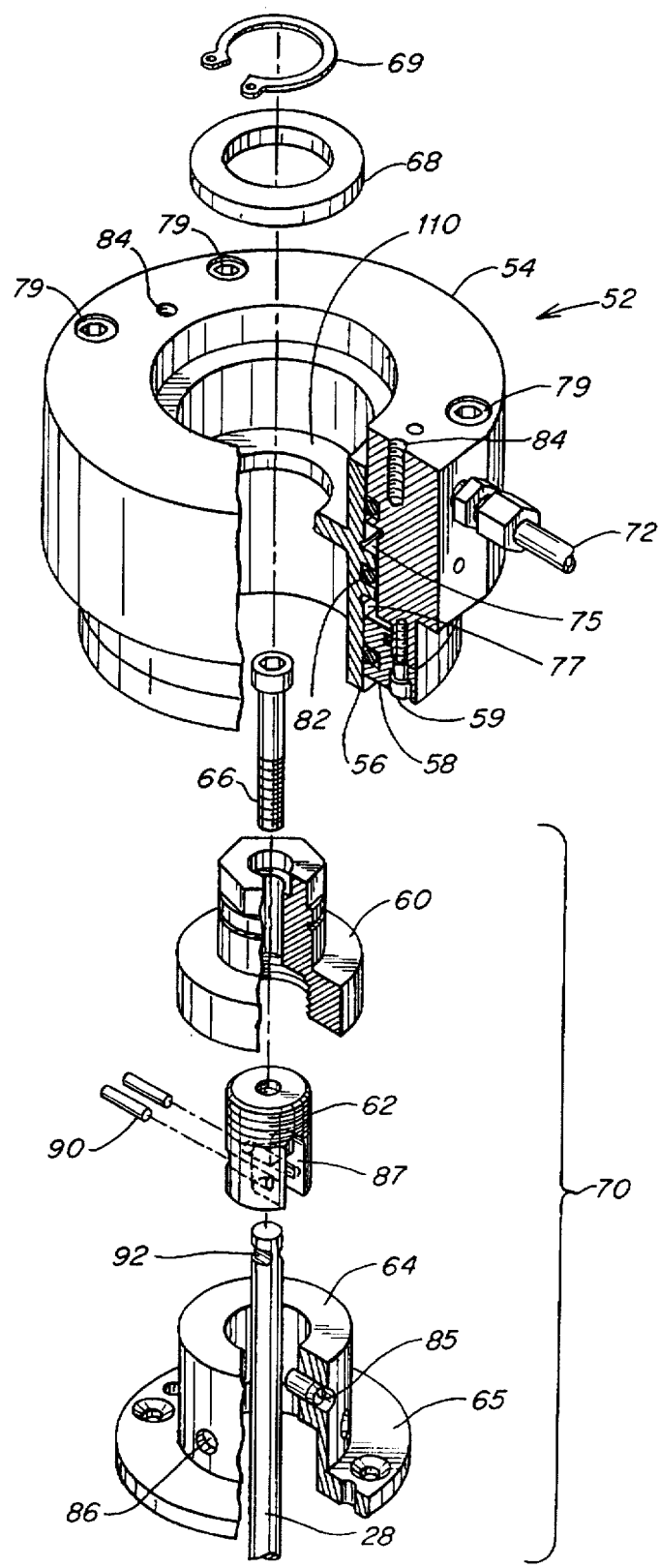
FIG. 9 is an exploded perspective view of the valve pin actuator showing the various components thereof.

FIGS. 8 and 9 also illustrate other components which make up the valve pin assembly 70, such as the actuator cap 60, the pin head 62, the actuator support 64, and the locking screw 66. As seen in FIG. 8, the ring 68 and associated snap ring 69 facilitate interconnection between the valve pin assembly 70 and the piston 56.

Figure 4:
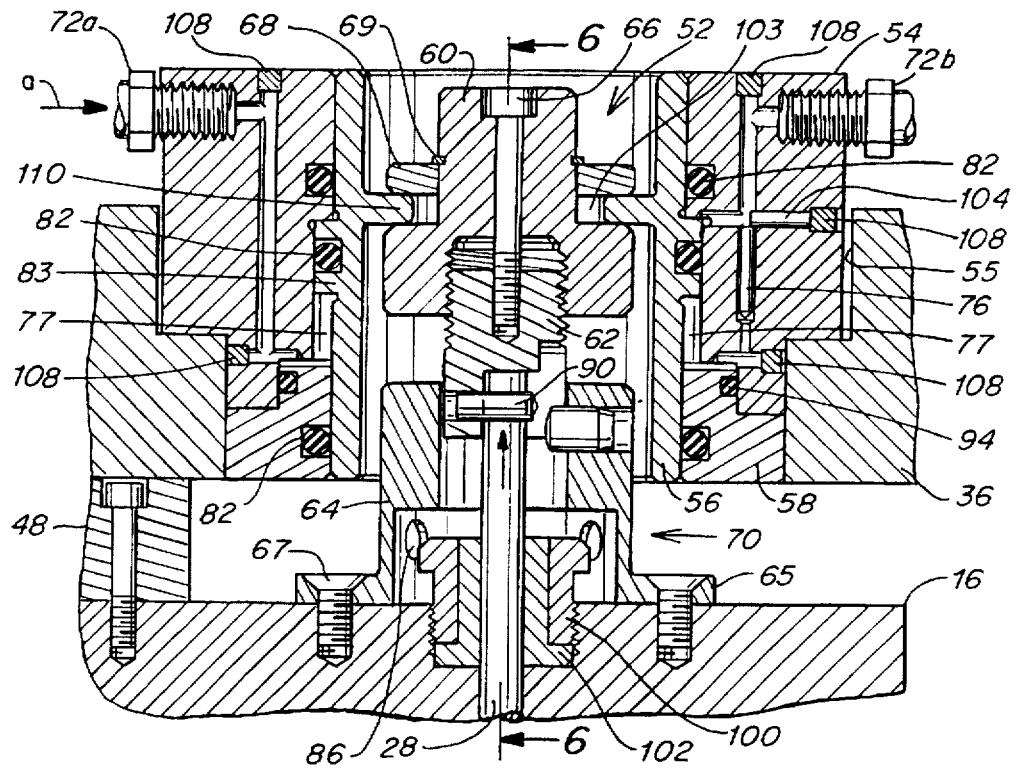
FIG. 4 is a somewhat schematic cross-sectional side view of the valve pin actuator similar to that illustrated in FIG. 3, but illustrating both fluid ports simultaneously and the piston in its "up" position.
Figure 5:
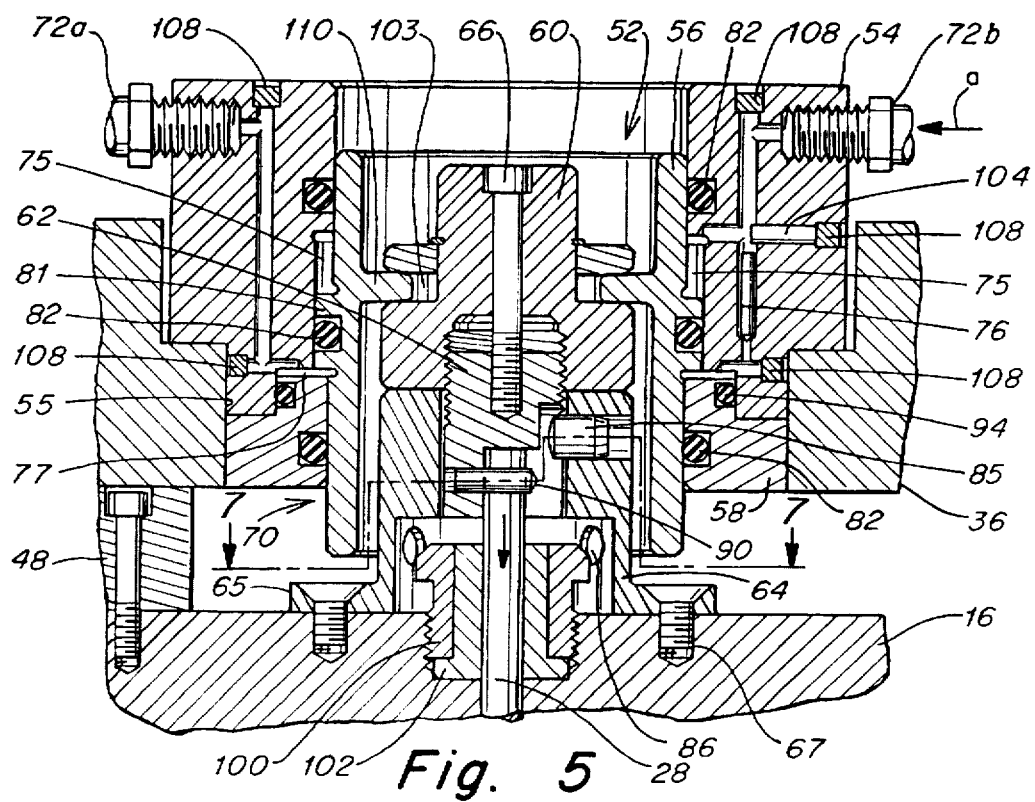
FIG. 5 is also a somewhat schematic cross-sectional side view of the valve pin actuator as illustrated in FIG. 4, but with the piston shown in its "down" position.

The valve actuator cylinder 54 has two hydraulic lines 72 that connect thereto, as illustrated in FIG. 2. These hydraulic lines provide pressurized fluid between the piston 56 and the cylinder 54 to facilitate movement of the piston within the cylinder. In this regard, refer to FIGS. 4 and 5. In FIGS. 4 and 5 it is noted that the hydraulic lines 72 are schematically shown on opposite sides of the cylinder 54. In actuality, these lines are disposed as illustrated in FIG. 2, but for the sake of schematic explanation, they are illustrated on opposite sides of the cylinder in FIGS. 4 and 5 to more clearly describe the operation of the hydraulic circuit as it relates to operation of the actuator assembly 52 and valve pin assembly 70.

In FIGS. 4 and 5, the pressure is applied as indicated by arrows "a". In FIG. 4, the pressure is inputted at the hydraulic line 72*a* and in FIG. 5 an opposing pressure is illustrated at hydraulic line 72*b*. These pressures correspond to the positioning of the valve pin.

When hydraulic line 72*b* is pressurized, as in FIG. 5, the valve pin 28 is held in its down position (as shown). The piston 56 is moved to its down position by means of hydraulic fluid entering the annular port 75, and exerting pressure on annular flange 81. In that position, the check pin 76 is in its lowermost position and seals off fluid flow to the lower part of the hydraulic circuit.

When the other hydraulic line 72*a* is pressurized, as in FIG. 4, the valve pin moves to the up position with hydraulic pressure being imposed at the port 77 against annular flange 83 of piston 56 to move the piston 56 in an upward direction. In this instance, the check pin 76 is in the "up" position and permits some fluid flow from the lower hydraulic circuit to the upper hydraulic circuit, as explained in greater detail hereinafter.

As indicated previously, the cylinder 54 is positioned in a recess or aperture 55 that is machined in the top clamp plate 36 and is held in position by four mounting screws 79, such as illustrated in FIGS. 2 and 3. The top of the cylinder 54 is provided with two lift holds 84. These lift holds enable the cylinder to be easily removed from the top clamp plate, when the screws 79 and the ring 69 are removed. The hydraulic lines 72 are located within machined channels in the top clamp plate. These channels are typically terminated on one side of the top clamp plate (nonoperator side) using quick disconnect fittings.

The cylinder 54 is in thermal contact with the top clamp plate as illustrated in FIG. 3. This thermal contact is important so that the cylinder remains relatively cool. On the other hand, the temperature of the manifold 16 is controlled to be at the plastic processing temperature (450° F.–550° F. typically). If the hydraulic cylinder gets too hot (greater than 400° F.) due to the manifold, there can be a degradation or damage of the O-rings 82.

Accordingly, as illustrated in FIGS. 1 and 3, the top clamp plate is provided with water cooling lines 44 machined through the top clamp plate. In this way, thermal contact between the valve cylinder 54 and the top clamp plate 36 is important in preventing the valve cylinder from getting too hot.

With regard to the description hereinbefore, reference has been made to hydraulic lines 72. However, the same principles also apply to the use of pneumatics instead of hydraulics. Typically, higher pressures are used in hydraulics such as 300–1500 p.s.i. Pneumatics are limited to plant supplied air pressure which is typically 85–100 p.s.i. Accordingly, a pneumatic actuator tends to be larger with increased piston area needed to generate forces equivalent to a hydraulic actuator.

As described above, movement of the valve pin 28 is caused by the piston 56 moving vertically within the valve cylinder 54 when pressurized. As indicated previously, there are three O-rings 82 that are provided. These O-rings may be constructed of Viton. The O-rings 82 provide hydraulic fluid seals between the piston 56 and the cylinder 54, as well as between the piston 56 and the retainer 58. Furthermore, other seals such as cup seals may be used.

The retainer 58 is used to support the piston 56 within the cylinder 54. The retainer 58 also limits the travel of the piston in the downward direction such as is illustrated in FIG. 5. The retainer is provided with a series of through holes and counter bores to receive the retainer screws 59, as illustrated, for example, in FIGS. 3, 8 and 9. As further illustrated, for example, in FIGS. 4 and 5, one of the larger O-rings 82 is disposed between the retainer 58 and the piston 56. This provides a hydraulic seal with the piston. A second smaller O-ring 94 is used to provide a hydraulic seal between the retainer 58 and the cylinder 54.

The valve pin assembly 70 secures the valve pin 28 to the actuator and includes actuator cap 60, actuator support 64, pin head 62, and locking screw 66. The valve pin assembly 70 is secured to the piston 56 primarily by means of the ring 68 and the associated snap ring 69, as illustrated in FIG. 8. The ring 68 and the snap ring 69 provide a clamping action to secure the valve pin assembly 70 to the piston 56.

Figure 6:
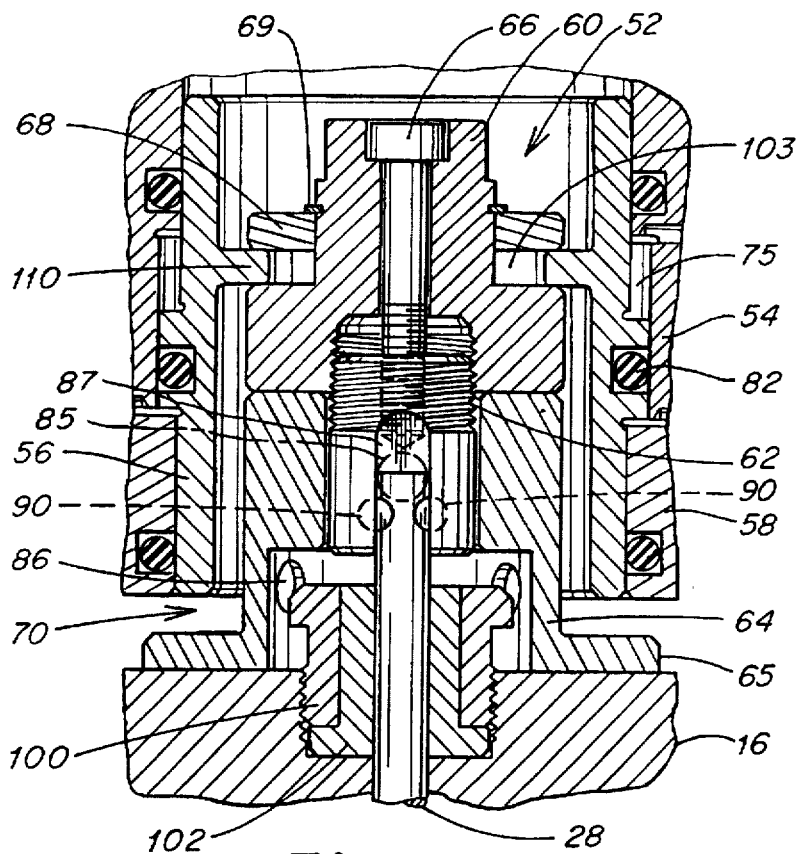
FIG. 6 is an enlarged fragmentary cross-sectional side view of the valve pin actuator detailing the valve pin actuator as taken along line 6—6 of FIG. 4.
Figure 7:
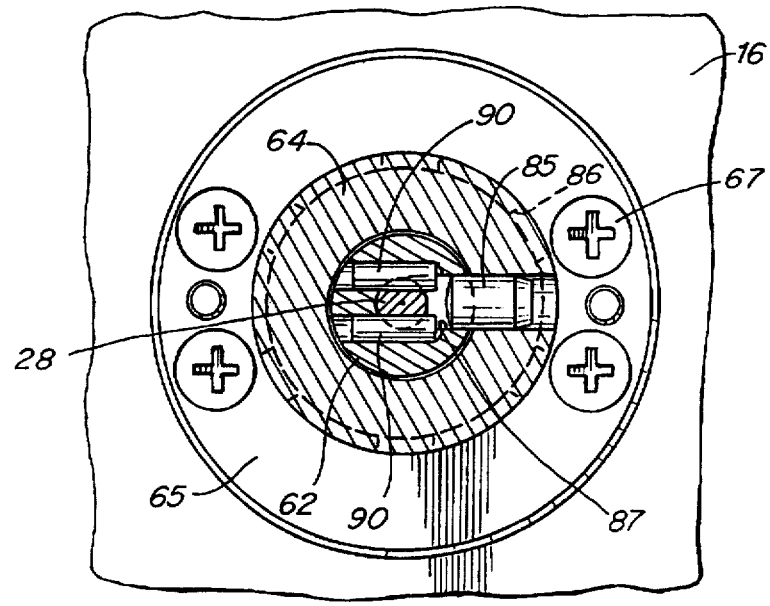
FIG. 7 is a cross-sectional plan view taken along line 7—7 of FIG. 5.

The actuator cap 60 has a counter bore and a through hole to receive the locking screw 66. The actuator cap 60 is also internally threaded, such as illustrated in FIGS. 4–6, to receive the externally threaded pin head 62.

The actuator support 64 has a base flange 65 that is used to mount the actuator support directly to the hot runner manifold 16. For providing this mounting, there are provided mounting screws 67. The actuator support 64 is preferably constructed of a material of low thermal conductivity such as titanium or stainless steel to increase the thermal gradient between the manifold 16 and the actuator assembly 52.

As illustrated in FIGS. 6–9, the actuator support 64 has a horizontal through hole to receive a relatively large dowel 85. Also, additional through holes 86 are provided to allow any plastic that may leak from the valve pin bushing 102 into the actuator support to flow out of the part without creating a high pressure.

The pin head 62 is used to retain the valve pin 28. As indicated previously, the pin head 62 is provided with external threads to hold the pin head to the actuator cap 60. Also, the pin head 62 has a central bore that is threaded to receive the end of the locking screw 66. See, for example, FIGS. 6 and 8. The pin head 62 is also provided with a transverse slot 87 to receive the large dowel 85, as illustrated in FIG. 9. The vertical slot 87 allows the valve pin assembly 70 to move vertically relative to the dowel. The vertical slot 87 and the dowel 85 serve to prevent rotation of the valve pin assembly and maintain angular alignment of the valve pin relative to the gate 32.

The pin head 62 has a central hole for receiving the top of the valve pin and also has two horizontal holes as illustrated in FIG. 9, for receiving the pair of dowel pins 90. FIG. 9 also shows corresponding slots 92 at the top of the valve pin 28 for receiving the dowel pins 90. The two dowel pins 90 are used to hold the valve pin 28 with respect to the pin head 62 while preventing rotation of the valve pin. The larger dowel 85 is used to prevent rotation of the valve pin assembly 70. The lock screw 66, when tightened, insures that the pin head 62 does not rotate with respect to the actuator cap 60.

Associated with the hot runner manifold 16 is a bushing nut 100, as illustrated, for example, in FIG. 8. The bushing nut has external threads as illustrated for engagement into the hot runner manifold 16. The bushing nut serves to retain the valve pin bushing 102 in position without exerting any axial stresses that can cause binding of the valve pin 28. The valve pin bushing 102 provides a guide for the valve pin 28. Using tight tolerances, a plastic seal is created between the valve pin 28 and the valve pin bushing 102. The bottom surface of the valve pin bushing 102 provides a seal between the manifold 16 and the bushing 102 to prevent plastic leakage.

With regard to the operation of the hydraulic circuit of the actuator assembly 52, the check pin 76 is positioned, such as illustrated in FIGS. 4 and 5, in a bore in the cylinder 54. The bore is dimensioned so as to provide for a small amount of hydraulic fluid flow between the two hydraulic ports. A small gap between the check pin and the bore will limit the flow substantially. The flow is unidirectional. When the check pin is in the "up" position, as in FIG. 4, a flow about the pin is allowed. When the check pin is in the "down" position as illustrated in FIG. 5, the check pin seals against a taper at the bottom of the bore. The purpose of the flow is to allow any air that may otherwise be trapped in the hydraulic lines to be bled out of the lines.

In addition to the check pin 76, there is also provided a pin stop 104 that limits the travel of the check pin 76 in the vertical direction. The hydraulic circuit of the actuator assembly 52 also includes metal expansion plugs 108 that are used to cap the ends of the bores in the cylinder used for hydraulic fluid flow, such plugs as Lee or CV plugs may be used.

There are several benefits with the construction of the present invention, particularly in comparison with the prior art previously described. For example, the assembly and disassembly of the top clamp plate 36, and of the entire injection molding system 10, are greatly simplified. The disassembly of the hydraulic actuator assembly 52 from the hot manifold is accomplished by simply removing the ring 68 and associated snap ring 69 as shown in FIG. 8. The cylinder 54 and piston 56 along with the hydraulic fluid lines are essentially retained within the top clamp plate 36, while the valve pin assembly 70 remains with the hot runner manifold 16. With the system of the present invention, there is no need to drain the hydraulic fluid for disassembly, and there is no need to remove the valve pin from the hot runner manifold.

Another clear advantage of the actuator of the present invention is the manner in which there is essentially a self-alignment between the actuator assembly 52 and the valve pin assembly 70. In this regard, reference can be made to such drawings as FIGS. 4–6 which show that the valve pin assembly 70 is supported in a manner that would allow some limited side-to-side motion in any direction thereof as the hot runner manifold undergoes certain expansion such as might be indicated by the arrow B in FIG. 3. This is facilitated by the interaction of the ring 68, actuator cap 60 and the annular flange 110 extending inwardly of the piston 56. When the manifold, and valve pin assembly 70 mounted thereto, moves, the flange and piston can move side to side within the clearance 103 that is formed between the actuator cap 60 and the flange 110.

In one embodiment of the present invention, there is about a 0.25" clearance radially between the actuator cap 60 and the piston 56. This clearance allows for relative expansion between the hot runner manifold 16 and the top clamp plate 36 essentially in any direction without putting a significant side load force on the valve pin 28. It is also preferred that the piston 56 includes a plating thereon, such as chrome. This plating adds lubricity and insures slippage between the piston 56 and the actuator cap 60 during heat up or cool down of the manifold.

Another important benefit of the present invention is the particular check pin design as illustrated herein. This design provides for a small flow of hydraulic fluid about the check pin 76. In contrast, prior designs required two additional hydraulic ports for bleed lines. That doubled the number of lines needed to be run in the top clamp plate.

A further benefit of the present invention is the ease with which the valve pin can be adjusted. Valve pin adjustment is necessary so that the pin can be positioned to seat at a precise location in the gate, to eliminate vestige on the molded part. With the snap ring 69, ring 68 and locking screw 66 removed, rotation of the actuator cap 60, which is threaded onto the pin head 62, will raise or lower the valve pin 28 with respect to the hot runner manifold and the gate. Replacement of the locking screw 66 then locks the new position of the valve pin in place. This adjustment can be done with or without the top clamp plate 36 in place.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. A valve pin actuator for use in an injection molding system adapted for mounting between a plastic distribution manifold and an overlying clamping plate, the valve pin actuator coupled to a valve pin adapted to extend through an injection nozzle and positioned to seat and unseat at a mold gate, said valve pin actuator comprising:
   a cylinder mounted to the clamping plate;
   a piston slidably mounted in the cylinder;
   a valve pin assembly carried by the piston and for holding a top end of the valve pin; and
   a circuit coupled to said piston to control sliding movement thereof and in turn translation of said valve pin between the seated and unseated positions, wherein the circuit is hydraulic and includes a pair of fluid lines coupled to said cylinder and said circuit includes a check pin adapted to allow fluid flow there around in only one position thereof;
   said valve pin assembly including:
      a first part removably secured to the piston so as to translate therewith,
      and a second part for receiving said valve pin and secured to said manifold.

2. The valve pin actuator as set forth in claim 1, including a retainer and means for securing the retainer to the cylinder, wherein the retainer limits the translational displacement of the piston in a lower position.

3. The valve pin actuator as set forth in claim 2, including a plurality of sealing O-rings disposed between the cylinder, piston and retainer.

4. The valve pin actuator as set forth in claim 2, wherein said cylinder includes means for limiting the translational displacement of the piston in an upper position.

5. The valve pin actuator as set forth in claim 2, wherein said piston has an inwardly directed annular flange that interlocks with said first part.

6. The valve pin actuator as set forth in claim 1, wherein said first part comprises an actuator cap.

7. The valve pin actuator as set forth in claim 6, wherein said piston has an inwardly directed annular flange engaging a step shoulder of said actuator cap.

8. The valve pin actuator as set forth in claim 7, including a ring and associated snap ring disposed over said annular flange and secured to said actuator cap.

9. The valve pin actuator as set forth in claim 6, wherein said second part comprises an actuator support and means for securing the actuator support to the top of the manifold.

10. The valve pin actuator as set forth in claim 1, wherein said valve pin assembly is adapted to move laterally with said manifold relative to said clamp plate, said cylinder and said piston.

11. The valve pin actuator as set forth in claim 10, wherein there is a space between said first part and said piston to permit lateral movement of the first part relative to the piston, while the first part and piston are secured.

12. A valve pin actuator for use in an injection molding system adapted for mounting between a plastic distribution manifold and an overlying clamping plate, the valve pin actuator coupled to a valve pin adapted to extend through an injection nozzle and positioned to seat and unseat at a mold gate, said valve pin actuator comprising:
   a cylinder mounted to the clamping plate;
   a piston slidably mounted in the cylinder;
   a valve pin assembly carried by the piston and for holding a top end of the valve pin; and
   a circuit coupled to said piston to control sliding movement thereof and in turn translation of said valve pin between the seated and unseated positions;
   said valve pin assembly including;
      a first part removably secured to the piston so as to translate therewith, the first part including an actuator cap;
      and a second part for receiving said valve pin and secured to said manifold, the second part including an actuator support and means for securing the actuator support to the top of the manifold;
   wherein the valve pin includes a pin head secured to the actuator cap.

13. The valve pin actuator as set forth in claim 12, including dowel means for securing the top of the valve pin to the pin head.

14. The valve pin actuator as set forth in claim 13, wherein said pin head has a slot for receiving a dowel pin carried by the actuator support.

15. The valve pin actuator as set forth in claim 14, wherein said pin head threads into said actuator cap.

16. The valve pin actuator as set forth in claim 15, including a locking screw for securing the pin head to the actuator cap.

17. The valve pin actuator as set forth in claim 16, wherein said actuator support has plastic leakage holes.

18. The valve pin actuator as set forth in claim 13, including a valve pin bushing and associated bushing nut for securing the valve pin bushing to the manifold.

19. The valve pin actuator as set forth in claim 18, wherein said dowel means includes a pair of dowels received in opposed slots in the top of the valve pin.

20. A valve pin actuator for use in an injection molding system adapted for mounting between a plastic distribution manifold and an overlying clamping plate, the valve pin actuator coupled to a valve pin adapted to extend through an injection nozzle and positioned to seat and unseat at a mold gate, said valve pin actuator comprising:

a cylinder mounted to the clamping plate;

a piston slidably mounted in the cylinder;

a valve pin assembly carried by the piston and for holding a top end of the valve pin; and a circuit coupled to said piston to control sliding movement thereof and in turn translation of said valve pin between the seated and unseated positions, wherein said circuit is a hydraulic circuit and includes:

first and second hydraulic lines for respectively providing pressurized fluid to first and second chambers, wherein during operation of the hydraulic circuit, one line is pressurized, and one line is not pressurized;

a check pin disposed between the first and second chambers that permits flow from said first chamber to said second chamber when said first hydraulic line is pressurized, and blocks flow from said second chamber to said first chamber when said second hydraulic line is pressurized;

said valve pin assembly including;

a first part removably secured to the piston so as to translate therewith;

and a second part for receiving said valve pin and secured to said manifold.

* * * * *

UNITED STATES PATENT AND TRADEMARK OFFICE
CERTIFICATE OF CORRRECTION

PATENT NO. : 5,894,025
DATED : April 13, 1999
INVENTOR(S) : Christopher W. Lee, et al.

It is certified that error appears in the above-identified patent and that said Letters Patent is hereby corrected as shown below:

On the title page item [56], insert --

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | DE | 3 | 3 | 3 | 6 | 203 A 1 | 04/18/85 | Germany | | | | |
| | | EP | 0 | 6 | 3 | 5 | 350 A 1 | 01/25/95 | Europe | | | | |

--.

Signed and Sealed this

Ninth Day of November, 1999

Attest:

Q. TODD DICKINSON

Attesting Officer   Acting Commissioner of Patents and Trademarks

(12) EX PARTE REEXAMINATION CERTIFICATE (7955th)
United States Patent
Lee et al.

(10) Number: US 5,894,025 C1
(45) Certificate Issued: Jan. 4, 2011

(54) VALVE PIN ACTUATOR

(75) Inventors: Christopher W. Lee, Burlington, MA (US); Mark D. Moss, Boxford, MA (US)

(73) Assignee: The Royal Bank of Scotland, PLC, New York, NY (US)

Reexamination Request:
No. 90/009,602, Nov. 30, 2009

Reexamination Certificate for:
Patent No.: 5,894,025
Issued: Apr. 13, 1999
Appl. No.: 08/874,962
Filed: Jun. 13, 1997

Certificate of Correction issued Nov. 9, 1999.

(51) Int. Cl.
*B29C 45/27* (2006.01)
*B29C 45/28* (2006.01)

(52) U.S. Cl. .................................. 425/562; 425/564
(58) Field of Classification Search .................. None
See application file for complete search history.

(56) References Cited

U.S. PATENT DOCUMENTS

| | | | |
|---|---|---|---|
| 3,024,498 A | 3/1962 | Bronnenkant et al. | |
| 4,173,448 A | 11/1979 | Rees et al. | |
| 4,279,582 A | 7/1981 | Osuna-Diaz | |
| 4,389,002 A | 6/1983 | Devellian et al. | |
| 4,468,191 A | 8/1984 | Gellert | |
| 4,500,279 A | 2/1985 | Devellian et al. | |
| 4,521,177 A | 6/1985 | Blank et al. | |
| 4,521,179 A | 6/1985 | Gellert | |
| 4,698,013 A | 10/1987 | Butcher | |
| 4,705,473 A | 11/1987 | Schmidt | |

(Continued)

FOREIGN PATENT DOCUMENTS

| | | | |
|---|---|---|---|
| DE | 3336203 A1 | 4/1985 | |
| DE | 3403603 A1 | 8/1985 | |
| EP | 0635350 A1 | 1/1995 | |
| JP | 05318533 A | 3/1993 | |
| KR | 1998-0008503 | 4/1998 | |

OTHER PUBLICATIONS

"Kona HYD-4 Valve Gate Actuator", DWG No. 47-18-101, Rev. 3, 1 page (date unknown).
"T-10VG Installation and Seal Ring Details," DWG No. T10VG-001, Rev. 4, 1 page (date unknown).
1976 Husky Hydraulic actuator engineering drawings, 5 pages (1976).
Kona Bulletin 406, "Valve Gate Hot Runner Systems," 1 page (Feb. 1993).
Heat Pipe Manual—Synventive Molding Solutions, Heat Pipe Installation and Operating Manual, pp. 51-55 (May 2002).
William J. Hume, Dynisco HotRunners, Valve Gate Hot Runner System, 7 pages (date unknown).
Plastic World, "Zero vestige valve gate nozzle", Abstract Circle 219, Kona Corporation, p. 58 (Jun. 1995).
Synventive Molding Solutions, Heat Pipe Installation and Operating Manual, pp. 53-58 (May 2003).

*Primary Examiner*—Eric S. Keasel

(57) ABSTRACT

A valve pin actuator is disclosed that includes a cylinder mounted to the clamping plate, a piston slidably mounted in the cylinder, and a valve pin assembly carried by the piston. A hydraulic or pneumatic circuit is provided for controlling the movement of the piston, and in turn translation of the valve pin between the seated and unseated positions. The valve pin assembly includes a first part removably secured to the piston so as to translate therewith, and a second part for receiving the valve pin and secured to said manifold. The actuator assembly enables removal of the clamping plate without removal of the valve pin assembly, and also adjusting of the valve pin without removal of the clamping plate. The assembly further provides a clearance between the piston and valve pin assembly, to accommodate expansion and movement of the manifold that would otherwise cause a side load to be exerted on the valve pin.

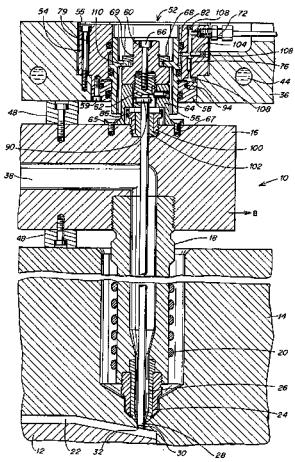

U.S. PATENT DOCUMENTS

| | | |
|---|---|---|
| 5,160,746 A | 11/1992 | Dodge, II et al. |
| 5,375,944 A | 12/1994 | Kotani et al. |
| 5,492,467 A | 2/1996 | Hume et al. |
| 5,545,028 A | 8/1996 | Hume et al. |
| 5,554,395 A | 9/1996 | Hume et al. |
| 5,635,227 A | 6/1997 | Whisenhunt et al. |
| 5,660,369 A | 8/1997 | Gauler |
| 5,674,439 A | 10/1997 | Hume et al. |
| 5,820,803 A | 10/1998 | Hashimoto |
| 5,858,301 A | 1/1999 | Hashimoto |
| 5,871,786 A | 2/1999 | Hume et al. |
| 5,885,628 A | 3/1999 | Swenson et al. |
| 5,916,605 A | 6/1999 | Swenson et al. |
| 5,948,448 A | 9/1999 | Schmidt |
| 5,948,450 A | 9/1999 | Swenson et al. |
| 5,980,237 A | 11/1999 | Swenson et al. |
| 6,062,840 A | 5/2000 | Lee et al. |
| 6,254,377 B1 | 7/2001 | Kazmer et al. |
| 6,261,075 B1 | 7/2001 | Lee et al. |
| 6,261,084 B1 | 7/2001 | Schmidt |
| 6,287,107 B1 | 9/2001 | Kazmer et al. |
| 6,294,122 B1 | 9/2001 | Moss et al. |
| 6,309,208 B1 | 10/2001 | Kazmer et al. |
| 6,343,921 B1 | 2/2002 | Kazmer et al. |
| 6,343,922 B1 | 2/2002 | Kazmer et al. |
| 6,361,300 B1 | 3/2002 | Kazmer et al. |
| 6,419,870 B1 | 7/2002 | Lee et al. |
| 6,436,320 B1 | 8/2002 | Kazmer et al. |
| 6,464,909 B1 | 10/2002 | Kazmer et al. |

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 12 is confirmed.

Claims 1-11 and 13-20 were not reexamined.

* * * * *